Figure 1:
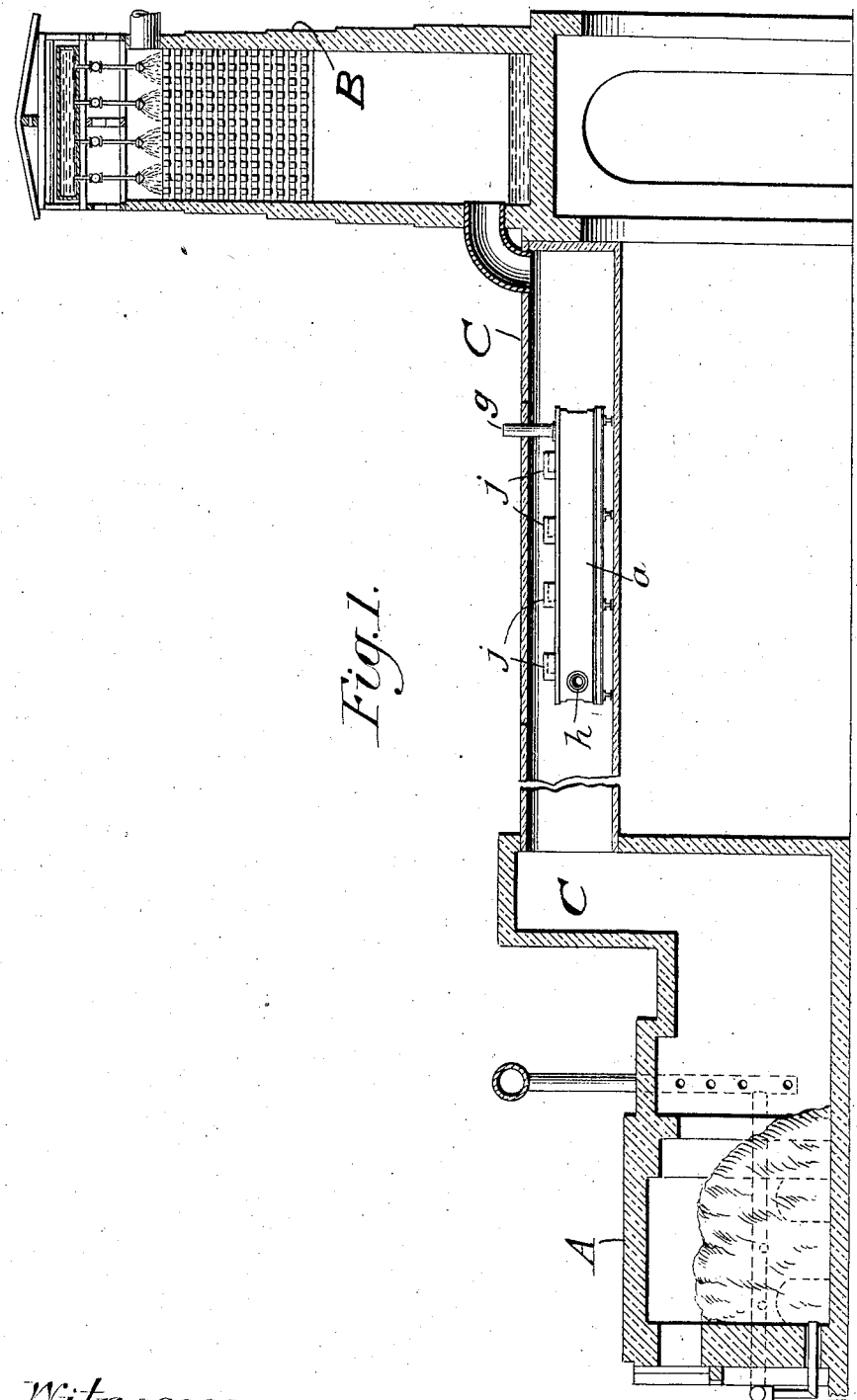

No. 768,108. PATENTED AUG. 23, 1904.
A. ZANNER.
SULFURIC ACID PLANT.
APPLICATION FILED MAY 14, 1903.
NO MODEL. 2 SHEETS—SHEET 1.

Witnesses: Inventor:
Adolf Zanner,
by Pennie & Goldsborough
Attys

No. 768,108. PATENTED AUG. 23, 1904.
A. ZANNER.
SULFURIC ACID PLANT.
APPLICATION FILED MAY 14, 1903.
NO MODEL. 2 SHEETS—SHEET 2.
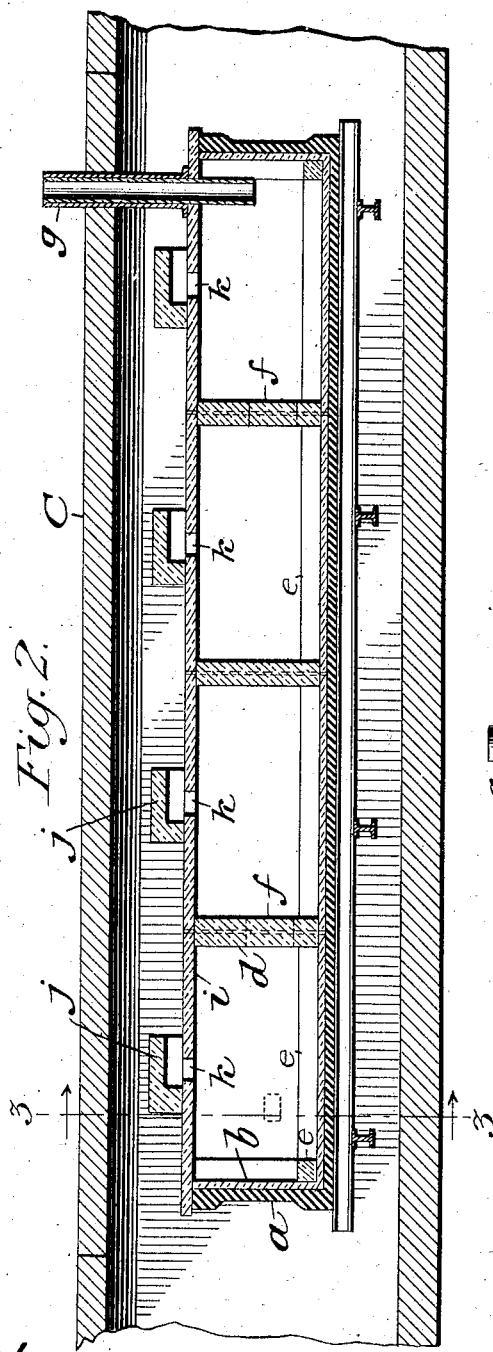
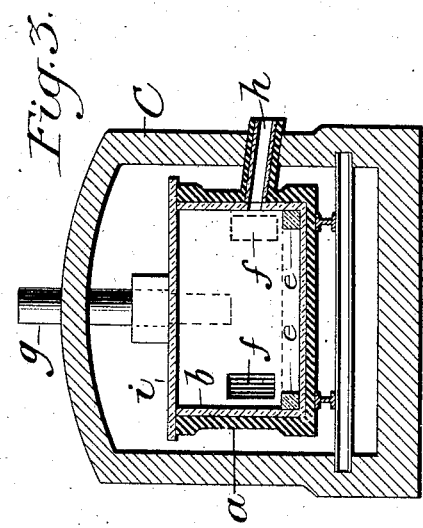
Witnesses: Inventor:
Adolf Zanner, No. 768,108. Patented August 23, 1904.

UNITED STATES PATENT OFFICE.

ADOLF ZANNER, OF BRUSSELS, BELGIUM.

SULFURIC-ACID PLANT.

SPECIFICATION forming part of Letters Patent No. 768,108, dated August 23, 1904.

Application filed May 14, 1903. Serial No. 157,104. (No model.)

*To all whom it may concern:*

Be it known that I, ADOLF ZANNER, a subject of the King of Belgium, residing at Brussels, Belgium, have invented certain new and useful Improvements in Sulfuric-Acid Plants; and I do hereby declare the following to be a full, clear, and exact description of the invention, such as will enable others skilled in the art to which it appertains to make and use the same.

The present invention relates to the establishment of a plant for the manufacture of sulfuric acid wherein the sulfur burning or roasting furnace is connected to the Glover tower through the intermediacy of conveying-flues of such capacity and arrangement as to receive an appropriate number of concentrating vessels or receptacles, so that the waste heat of the gases from the roasting-furnace may be utilized to effect the further concentration of the sulfuric acid recovered from the Glover tower while at the same time correspondingly reducing the temperature of the gases, so that the presence of the concentrating vessels will afford a means for establishing or regulating the temperature with which the gases enter the base of the Glover tower.

In the accompanying drawings, Figure 1 represents a sectional elevation of a plant established in accordance with my invention. Fig. 2 represents a larger sectional view of a portion of the connecting-flue and its contained concentrating vessels. Fig. 3 represents a transverse sectional view on the line 3 3 of Fig. 2.

Similar letters of reference indicate similar parts throughout the several views.

Referring to the drawings, A indicates a sulfur burning or roasting furnace of any suitable type, and B indicates a Glover tower. Between these two structures extends the conduit or flue C, discharging the gases from the furnace A into the base of the Glover tower.

The flue C is, in accordance with my invention, made of sufficient extent and capacity to readily receive one or more vessels for the concentration of sulfuric acid, whether chamber-acid or acid produced by the Glover process. As illustrated in Fig. 1, these receptacles may be inserted in the flue through a top opening provided for that purpose. They may be of any desired construction, the construction illustrated in the drawings being that represented, for example, in my German Patent No. 134,661, dated April 2, 1901, for a process of concentrating sulfuric acid. The outer vessel $a$ may, for instance, have its inner surface lined with plates $b$, of stoneware or other acid-proof material, suitably cemented to the said inner surface, the joints between the plates being likewise closed or packed with the same cement, preferably soluble glass and asbestos. The transverse walls $d$ may be formed of the same acid-proof material as the inner walls of the receptacle and cover the joints between the plates $b$, so consolidating them that none of the plates can become loose even should the binding action of the cement fail to be maintained, which, of course, is not to be expected. Corner-fillets $e$, formed of stoneware, serve to close up the joints of the angles and to prevent the acid from gaining access through these joints. Apertures $f$ are provided in the several partitions, which apertures are arranged out of line with each other, so that the acid admitted through the pipe $g$ is compelled to follow a serpentine course on its way to the outlet-pipe $h$. The covers or lids $i$ of the several chambers consist of cast-iron plates lined with earthenware or similar material. For leading off the vapors or water of evaporation the caps $j$ are provided, which while permitting free exit of the watery vapor protects the openings $k$ from the ingress of flue-dust.

It will be noted that the inlet-port for the chamber-acid or Glover-tower acid is at the point farthest removed from the exit-aperture of the concentrated product. The freshly-admitted acid is therefore received at the cooler part of the concentrating vessel and issues at the hottest part thereof, receiving gradual increments of heat during its serpentine course through the vessel. Moreover, inasmuch as the water of evaporation from the concentrating vessel enters the body of sulfurous fumes and gases on their way to the Glover tower the presence of these vapors probably influences the formation of the sulfuric acid in the tower itself. Furthermore, the temperature with which the sulfurous fumes and gases enter the Glover tower may be established or regulated by increasing the number of concentrating vessels or by increasing the supply of acid thereto.

Having thus described my invention, what I claim is—

A plant for the manufacture of sulfuric acid, comprising a roasting-furnace, a Glover tower, a heating-flue for the passage of the sulfur fumes and gases from the furnace to the tower, and vessels for the concentration of sulfuric acid located within said flue and adapted to be inserted and withdrawn therefrom, said vessels being provided with an inlet or supply pipe extending through the wall of the flue so as to receive its supply from without, and a discharge-pipe likewise extending through the wall of the flue, and vapor-exit openings discharging into the flue, the inlet or supply pipe being located at the end proximate to the tower and the discharge-pipe being located at the end proximate to the furnace; substantially as described.

In testimony whereof I affix my signature in presence of two witnesses.

ADOLF ZANNER.

Witnesses:
MAURICE GERBCAULT,
GREGORY PHELAN.